June 7, 1932. H. A. DENMIRE 1,862,334
RUBBER STOCK FABRICATING MACHINE
Filed Nov. 16, 1926 4 Sheets-Sheet 2
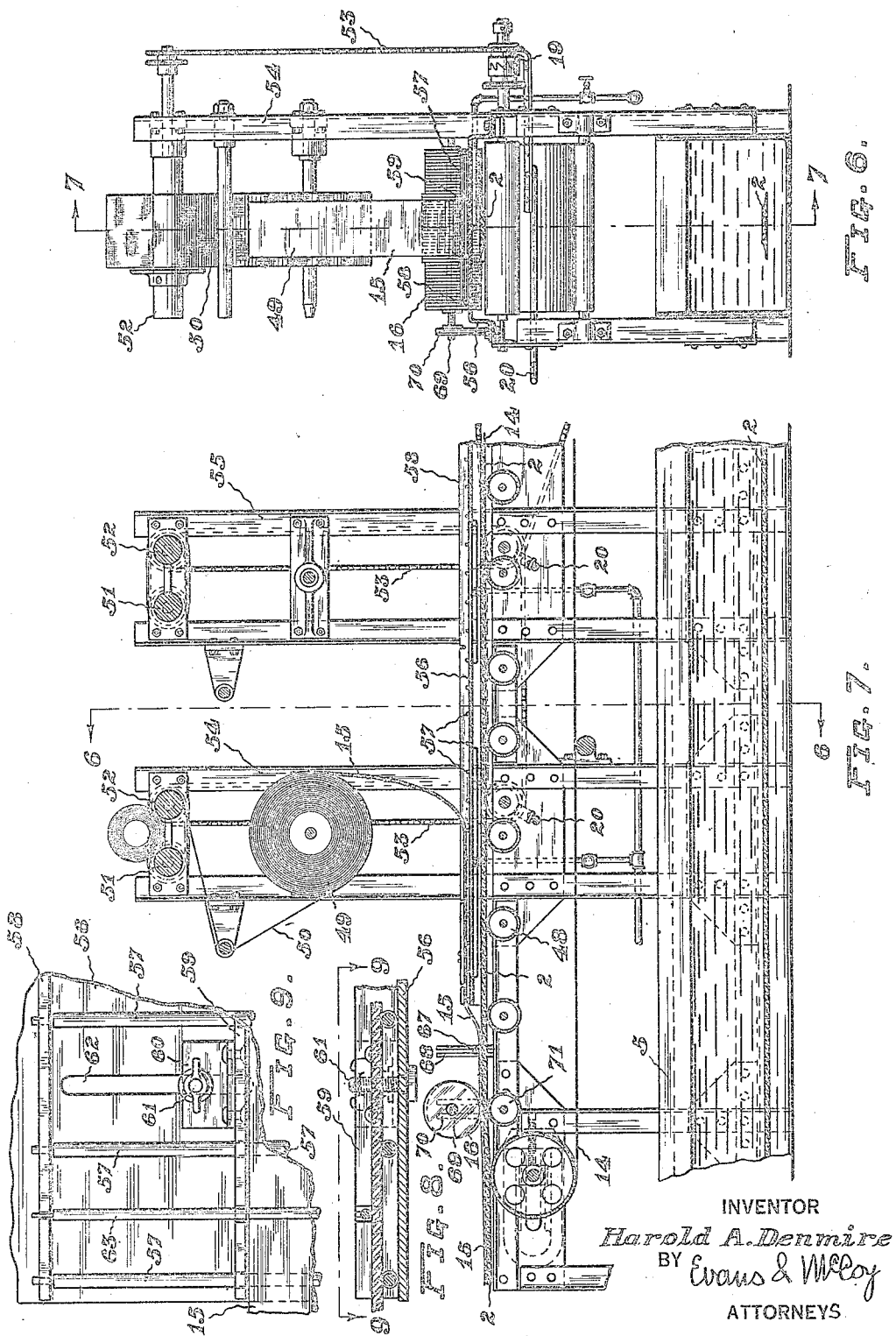
INVENTOR
Harold A. Denmire
BY Evans & McCoy
ATTORNEYS

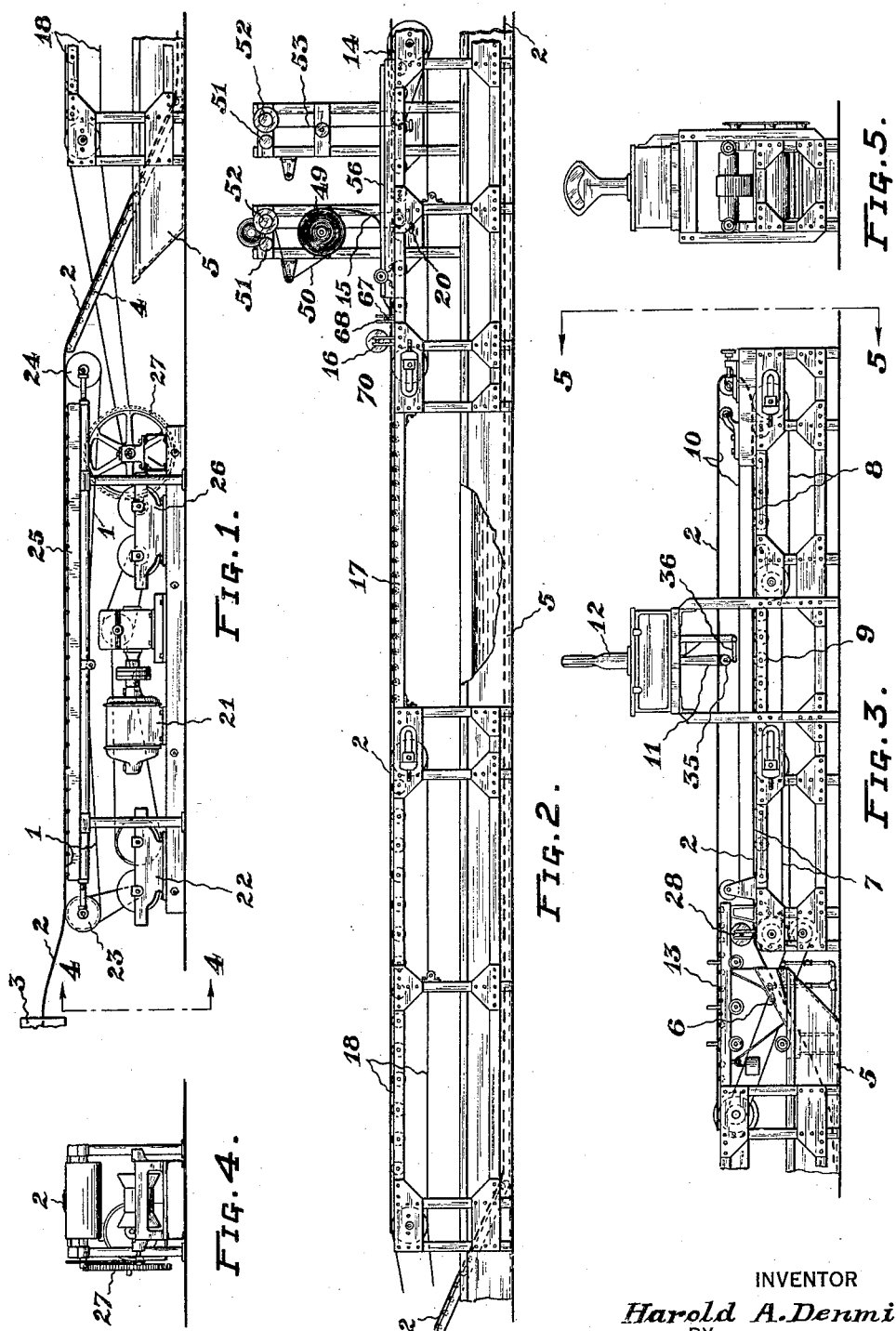

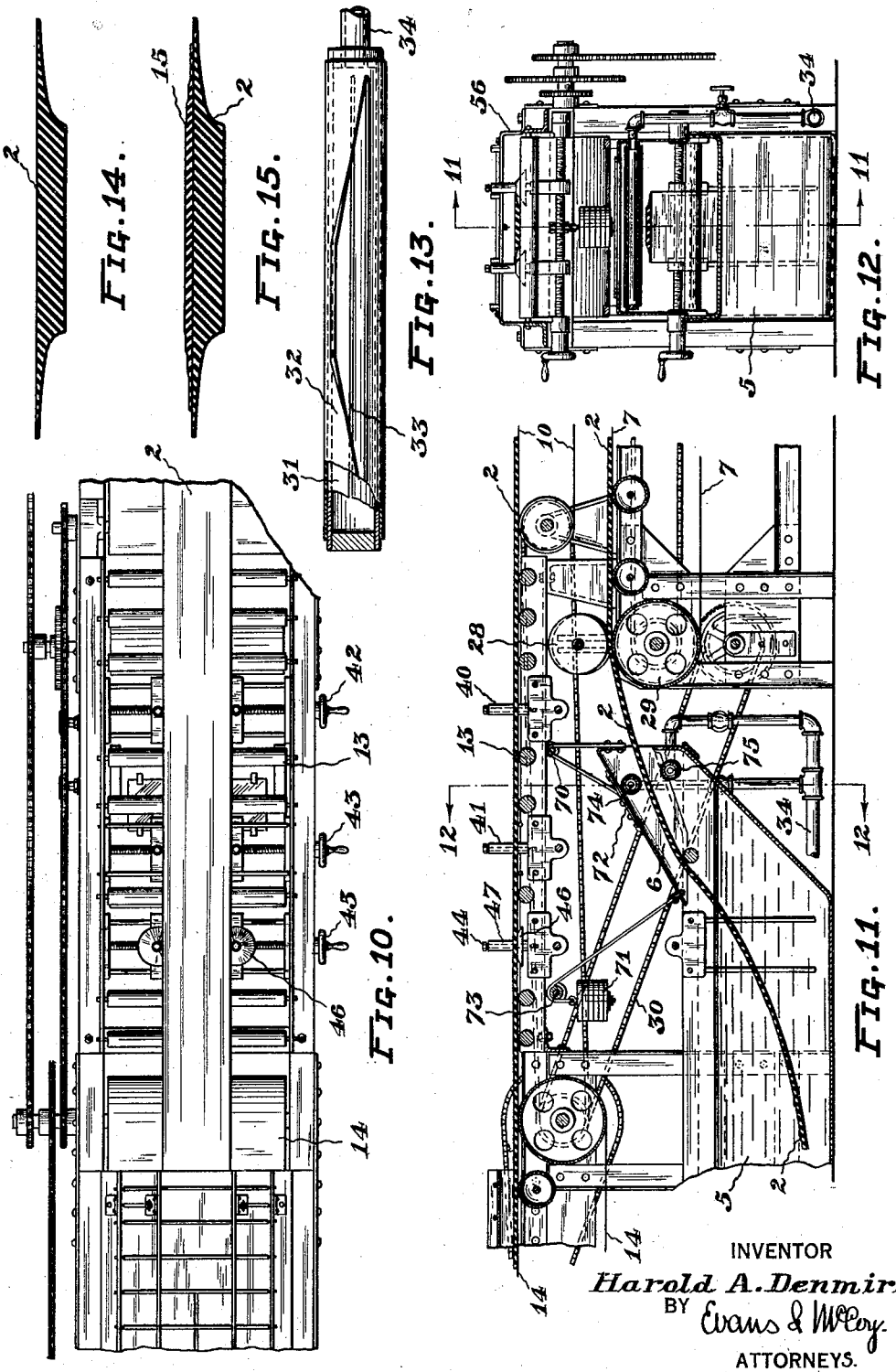

Patented June 7, 1932

1,862,334

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

RUBBER STOCK FABRICATING MACHINE

Application filed November 16, 1926. Serial No. 148,702.

This invention relates to a stock fabricating machine for use in connection with the manufacture of pneumatic tires and the like and it has for its object the provision of a machine that is capable of receiving extruded tread rubber stock directly from the extruding die, cooling and sizing said stock and assembling therewith cushion stock to provide completely fabricated tread units for use in the manufacture of pneumatic tire casings.

Fabricating machines of various kinds have heretofore been proposed although it is believed that fabricating machines embodying the various features of the present machine have never before been proposed.

A machine constructed in accordance with the invention is shown in the accompanying drawings wherein:

Figure 1 is a side elevational view of a portion of the extruding machine and the receiving end of the fabricating machine.

Fig. 2 is a continuation of the side elevational view of the fabricating machine showing the central portion of the machine embodying the cooling and the assembly elements of the machine.

Fig. 3 is a further continuation of the machine showing the end portion of the machine remote from the extruding die embodying the shrinker and the tread weighing element of the machine.

Fig. 4 is an end elevational view of the machine taken substantially on line 4—4 of Fig. 1 and looking in the direction of the arrows.

Fig. 5 is an end elevational view of the right hand end of the fabricating machine shown in Figs. 1, 2 and 3.

Fig. 6 is a sectional elevational view taken substantially on line 6—6 of Fig. 7 showing the stock assembly element of the machine.

Fig. 7 is a sectional view of the portion of the machine shown in Fig. 6 and taken substantially on line 7—7 thereof looking in the direction of the arrows.

Fig. 8 is an enlarged sectional view of the end portion of the assembly table shown in Fig. 7 and illustrating the arrangement of idler rollers of the assembly table which assist the movement and adjustment of the cushion stock relative to the extruded rubber stock.

Fig. 9 is a top plan view of the end portion of the assembly table shown in Fig. 8 and looking in the direction of the arrows 9—9 thereof.

Fig. 10 is a top plan view of the portion of the machine adjacent the assembly table and showing the methods of guiding the extruded tread body to position on the assembly table.

Fig. 11 is a sectional side elevational view taken substantially on line 11—11 of Fig. 12 showing the portion of the machine where the tread stock leaves the cooling bath as shown at the left end of the general assembly in Fig. 3.

Fig. 12 is a sectional elevational view, with parts broken away, of the portion of the machine shown in Fig. 11, the view being taken substantially on line 12—12 thereof.

Fig. 13 is an enlarged detail view of the adjustable air control sleeve for removing water from the tread body as it emerges from the cooling tank.

Fig. 14 is a transverse sectional view of the tread body as it appears before fabrication with the remainder of the completed tread unit.

Fig. 15 is a corresponding sectional view of a completely assembled tread unit.

Figure 16:
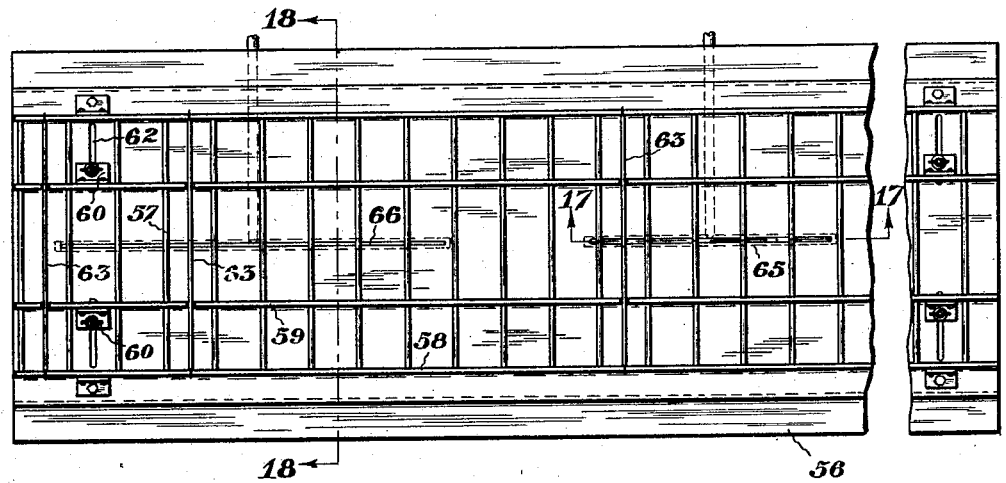
Fig. 16 is a top plan view of the assembly table showing the adjustable guides for positioning the cushion stock and the arrangement of air slots and idler rollers.

The fabricating machine herein proposed comprises in general a conveyor unit 1 that has a strip 2 of extruded rubber tread stock supplied thereto from an extruding machine 3. The conveyor unit 1 delivers the stock 2 over a set of idler rollers 4 to a cooling tank 5 that is filled with a sufficient quantity of water or other suitable liquid for effectively cooling the rubber stock as it traverses the cooling tank. The tread stock 2 after emerging from the liquid passes through a drying unit 6 that projects streams of air on the opposite faces of the stock to effectively remove the moisture therefrom prior to the assembly of the cushion stock therewith. The tread stock then passes over a pair of shrinkage conveyor units 7 and 8 that are differentially operated, the conveyor 8 moving slower than the conveyor 7 to so shrink the stock as to prevent any substantial contraction of the tread stock after it is cut to length. A series of idler rolls 9 are arranged intermediate the shrinkage conveyor units. From the conveyor unit 8 the tread stock 2 passes to an overlying conveyor belt 10 that is so arranged to conserve space. The belt 10 is of uniform weight and it passes over the scale pan 11 of a weighing mechanism 12 that indicates the unit weight of the tread stock as it passes over the scale pan. Control mechanism for changing the unit weight of the tread stock is mounted at the scale unit. The tread stock then passes over a series of idler rollers 13 to a conveyor belt 14 and into the assembly zone of the machine where a strip of cushion stock 15 is assembled with the tread unit and firmly stitched thereto by a series of stitcher rolls 16. The assembled tread stock and cushion strip then traverses the idler rolls 17 to a conveyer 18 where it is cut to length and placed in suitable books (not shown) for subsequent use in the assembly of pneumatic tires. This in general describes the major elements of the machine. The individual parts of the machine will next be described.

As a strip of tread stock 2 comes from the extruding machine 3 it is relatively plastic and is somewhat larger in cross sectional dimension than the desired finished stock. The stock is relatively soft when it is received on the conveyor belt 1 and it is reduced in size by operating the belt 1 somewhat faster than the rate of extrusion of the stock. In this manner the cross sectional area of the stock initially received by the machine can be closely controlled by varying the relative speed of extrusion and of the conveyor belt. Either the rate of extrusion or the speed of operation of the conveyor belt may be changed.

The conveyor belt 1 is driven from a prime mover 21 through suitable regulatable reduction gears 22 by means of which the speed of travel of the conveyor belt 1 is adjusted.

The conveyor belt 1 is carried on a pair of adjustably mounted pulley drums 23 and 24 that are respectively supported from the conveyor frame 25. Reduction gearing 26, that operates a gear wheel 27, supplies power to the remainder of the machine through the conveyor unit 18.

The series of idler rolls 4, that are interposed between the conveyer belt 1 and the cooling trough 5, operate to transport the warm tread material 2 to the cooling tank 5 without material distortion. The stock is in a plastic heated condition at this stage in its fabrication and is very sensitive to differences in tension. The hot tread stock 2 is submerged in the water of the trough 5 and is drawn through the trough by the operation of the conveyor unit 7 that is mounted at the discharge end of the water trough. The cooling pan 5 is sufficiently long to suitably cool the tread stock as it traverses the trough. A weighted roll 28 holds the cooled tread stock against the conveyer 7 in order that the stock will travel with the conveyer belt at all times and will not slip on the belt.

The roll 28 is preferably formed of a series of metal discs that press all parts of the tread stock 2 against the conveyer belt 7 as the stock emerges from the tank. This enables the conveyer belt to advance the stock at a desired uniform rate of travel.

One end of the conveyer belt 7 extends over a driven pulley 29 that is driven from a sprocket chain 30 at a regulatable speed in order that the pull that is imposed on the tread stock as it traverses the cooling tank may be satisfactorily regulated.

The combination of the conveyer units 7 and 8, which are driven at different rates of speed, as heretofore explained, constitutes a shrinker for neutralizing internal stresses in the tread stock to thereby prevent shrinkage of the completely assembled unit.

The drying mechanism 6 is shown in detail in Fig. 11. The drying unit embodies a hinged cover member that is supported from a transverse pivot 70 and a counter-weight 71 and that has a transparent window 72 therein through which the operation of the device may be watched. The counter-weight is carried by a cable that extends over a suitably supported pulley 73. The drying is effected by a pair of air jet supplying members 74 and 75 that are arranged on opposite sides of the strip of extruded material as it comes from the cooling tank. Each of these members consists essentially of a pair of telescoped sleeve members 31 and 32, one of which has a narrow longitudinal slot 33 for supplying compressed air to the adjacent face of the tread stock to blow off the water and the other of which has a tapered aperture formed therein with angular opposed end portions that serve to regulate the effective length of the longitudinal slot 33 by the rotation of the sleeve 32 on the sleeve 31. These elements are shown in detail in Fig. 13 of the drawings. The air is fed under pressure to the drying unit from a source of air pressure 34. By making the slot 33 the width of the tread stock, the water that clings to the face of the tread stock is substantially removed in order that the stock may dry before it enters the assembly zone of the machine.

After the tread stock leaves the pair of shrinkage conveyers 7 and 8, it is carried upwardly over the weighing machine which serves as an index to the degree of stretch and shrinkage that should be imposed on the stock as it traverses the machine. The conveyer belt 10 that constitutes a part of the weighing machine, is balanced with sufficient accuracy to prevent objectionable errors in the indications of the weighing machine that arise from different weights of the different parts of the conveyer belt. The scale pan of the machine 11 is provided with a freely operating idler roller 35 and a torque arm 36 that compensates for belt drag over the idler roll.

The visible indicator of the scale unit enables the operator to regulate the differential speed of the different conveyer units to adjust the size of the tread stock from time to time. Automatic electrical control mechanism of conventional character could be used to control either the rate of extrusion or the speed of operation of the entire machine as desired. It is generally sufficient, however, to provide any desired form of manual control that can be regulated to adjust the weight of the tread stock.

The tread stock is guided to the center of the assembly belt 14 by pairs of adjustable guide rollers 40 and 41 that are respectively controlled by the hand wheels 42 and 43. A third set of guide rollers 44 that are controlled by hand wheel 45 serve finally to position the tread stock on the conveyor belt 14.

The guide rollers 44 of the third set are of improved design and each embodies a flanged frusto conical skirt portion 46 that underlies the tread stock and assists in shifting the sock laterally of the idler rolls over which the stock is carried. The flanged skirt provides a cradle-like support for the tread stock that materially assists the vertical portion 47 of the rolls in laterally shifting the stock without distortion. This form of guide roll could be used in other applications involving the positioning of a strip of plastic material with benefit.

The tread stock 2, now sized and shrunk to neutralize undesirable internal stresses, passes into the assembly zone of the machine. The conveyer unit 14 upon which the tread stock 2 is carried through the assembly zone, has a series of idler rollers 48 underlying and supporting its conveying surface.

The cushion stock 15 that is to be assembled with the tread stock 2, is supplied to the machine in rolls 49 that have a liner strip 50 that is wound on the roll with the cushion stock 15. A pair of drums 51 and 52 that are driven at substantially the same peripheral speed as the speed of travel of the tread stock 2, provide wind-up mechanism that serves to unwind the cushion stock at the desired rate of supply. The wind-up mechanism is driven from a chain connection 53 that is controlled through the releasable clutch 19. The handle 20 facilitates the engagement and disengagement of the clutch during operation. The supply roll 49 is supported from either the standard 54 or 55 in order that a new roll of stock may be placed on the machine without interrupting its operation.

The cushion stock 15 is delivered to an assembly table 56 that overlies the conveyer 14 and is spaced therefrom a sufficient distance to enable the tread stock 2 to pass thereunder on the conveyer, as particularly illustrated in Fig. 7 of the accompanying drawings. The assembly table has a series of idler rolls 57 mounted on its surface to receive the stock and facilitate its movement over the surface of the table. The freely rotatable idler rolls 57 are journaled in a pair of upstanding flanges 58 that are mounted along each edge portion of the table. The strip 15 of cushion stock material is received and partially supported by these idler rolls between a pair of adjustable guide flanges 59 that are secured in place by adjustable plates 60. Wing nut bolts 61, that extend through suitable slots 62 in the table surface, facilitate lateral adjustment of the guide members 59. One such guide member is mounted at each edge of the strip 15 in order that the strip may accurately be positioned laterally of the underlying strip of the extruded tread stock that is carried by the conveyer belt 14.

In order to prevent parts of the strip 15 of material from being lifted beyond the guide strips, and in order to maintain the strip of material substantially parallel with the table surface, a series of light weight freely acting rollers 63 are floatingly mounted in vertical slots formed in the guide members 59 in such manner that the weight of the roll maintains the strip of cushion stock evenly positioned over the surface of the assembly table.

Figure 17:
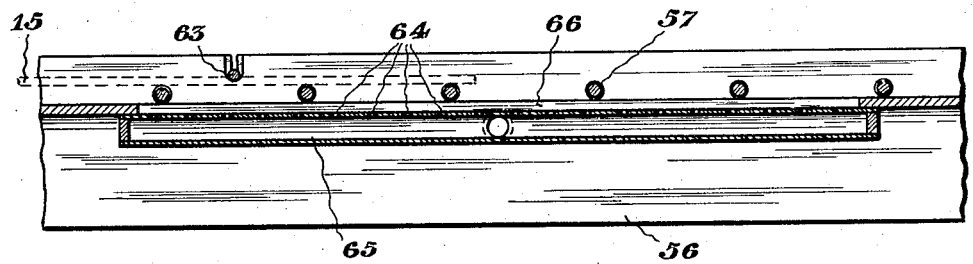
Fig. 17 is an enlarged sectional elevational view showing the air supply tube and idler roller arrangement, the view being taken substantially on line 17—17 of Fig. 16.
Figure 18:
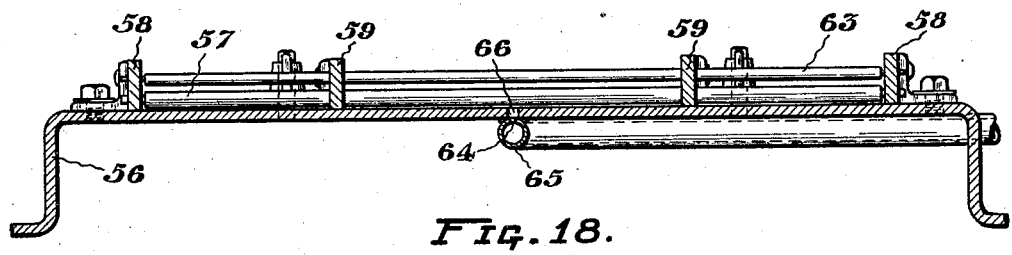
Fig. 18 is an enlarged sectional elevational view taken substantially on line 18—18 of Fig. 16.

In order to facilitate movement of the strip 15 of material laterally of the surface of the assembly table, the material is partially supported by a cushion of air that is supplied between the strip and the table by jets 64 of an air supply tube 65. The air supply tube 65 underlies a longitudinal slot 66 that is formed in the surface of the table. Although the air pressure is insufficient to completely lift the cushion stock, it does greatly reduce the friction of the stock on the idler rolls and substantially prevents the stock sticking thereto. This arrangement of the air cushion, as it is herein termed, is particularly shown in Figs. 16, 17 and 18 of the drawings. These drawings also show the adjustable guides 59 that are secured in place by the wing nut bolts 61.

The cushion stock is very tacky and difficult to mechanically handle. For this reason the stock is substantially floated by the air cushion that is provided by the longitudinally extending air tube underlying the longitudinal center of the stock. The air delivered therefrom substantially floats the stock between the adjustable guides 59 by means of which the cushion stock is centered over the tread stock.

At the end of the assembly table, the cushion stock 15 is fed directly upon the upper face of the tread stock 2. A small light weight roll 67 that is held between spaced upright guides 68 insures proper initial presentation of the cushion stock to the tread stock.

The stitching roll 16, that is made up of a series of metal discs through which extend a control rod 69, serve to press every part of the cushion stock into firm engagement with the tread stock. The apertures that are formed in each disc of the stitcher 16 are materially larger than the rod 69 in order that each disc will press upon the cushion stock. The rod 69 for the discs is supported between in guide members 70 one set of which is arranged on each side of the stock. An idler roll 71 directly underlies the conveyer belt 14 at the stitcher discs in order to provide a suitable support for the stock being stitched together.

After assembly of the stock, it passes over idler rolls 17 to the conveyer 18 where the assembled stock is cut to proper length for use in making up pneumatic tire casings.

The operation of the machine will be apparent from a consideration of the preceding description thereof. The main features of importance are the initial sizing of the tread stock delivered by the extruding machine that is effected by the operation of the conveyer belt 1 at greater speed than the speed of delivery of the stock. It is then cooled in the trough 5, dried and shrunk to remove objectionable internal stresses. The stock is weighed to insure uniform sizing, and it is delivered to the assembly zone of the machine. The cushion stock feed is controlled by the speed of operation of the wind-up mechanism and, if surplus cushion stock collects or if the feed is somewhat slower than the speed of application of the cushion stock, then the operator can, from time to time, operate the wind-up roll to delay or advance the speed of supply until stability is again arrived at. The clutch 19, that is operated by control handle 20, facilitates control of the wind-up roll.

The stock may be manually cut to proper length or an automatically operated shearing knife may be employed for cutting the stock.

A machine of the above described character is very useful in connection with the manufacture of tread units for pneumatic tire casings. The main features of the invention are the sizing and handling of plastic materials that are quite tacky and are assembled immediately after the base material leaves the extruding machine. No aging or prior cooling of the material is required. The stock is immediately available for use and is of uniform predetermined size. The advantages to be derived from the use of a machine of this character in the fabrication of plastic materials will be apparent to those skilled in the art.

Although I have herein described a preferred illustrative embodiment of the invention, it will be obvious to those skilled in the art that many changes can be made therein without departing from the spirit and scope of the invention. I desire, therefore, that only such limitations shall be imposed thereon, as are set forth in the accompanying claims.

What I claim is:

1. A machine for fabricating rubber stock comprising conveying means adapted to receive rubber stock from an extruding die, means for regulatably operating said conveying means at greater speed than the speed of extrusion of said stock, means for cooling said stock in its stretched condition, and a pair of differentially operated conveyer units the last of which operates at materially slower rate of speed than the unit receiving stock from the cooling means to shrink said stock to remove subsequent objectionable shrinkage therein.

2. A rubber stock fabricating machine comprising a conveyer adapted to receive extruded rubber stock from an extruding machine, adjustable means for operating the conveyer at a predetermined greater peripheral speed than the speed of extrusion of said rubber stock, a cooling tank adapted to receive and cool the rubber stock, a second conveyer adapted to draw said rubber stock through the tank at a predetermined adjustable rate of travel relative to the first conveyer, a third conveyer operated at materially slower speed than the second conveyer and adapted to shrink the rubber stock, means for superposing a second strip of rubber stock onto the extruded stock and stitching means for firmly uniting the stocks.

3. A rubber stock fabricating machine comprising a conveyer adapted to receive extruded rubber stock from an extruding machine, adjustable means for operating the conveyer at a predetermined greater peripheral speed than the speed of extrusion of said rubber stock, a cooling tank adapted to receive and cool the rubber stock, means for drying one surface of the stock as it leaves the cooling tank, a second conveyer adapted to draw said material through the tank at a predetermined adjustable rate of travel relative to the first conveyer, a third conveyer operated at materially slower speed than the second conveyer and adapted to shrink the material, means for superposing a second strip of rubber stock onto the extruded stock and stitching means for firmly uniting the stocks.

4. A rubber stock fabricating machine comprising a conveyer adapted to receive extruded rubber stock from an extruding machine, adjustable means for operating the conveyer at a predetermined greater peripheral speed than the speed of extrusion of said rubber stock, a cooling tank adapted to receive and cool the rubber stock, a second conveyer adapted to draw said rubber stock through the tank at a predetermined adjustable rate of travel relative to the first conveyer, a third conveyer operated at materially slower speed than the second conveyer and adapted to shrink the rubber stock, means for superposing a second strip of rubber stock onto the extruded stock, and stitching means for firmly uniting the stocks.

5. A rubber stock fabricating machine comprising a conveyer adapted to receive extruded rubber stock from an extruding machine, adjustable means for operating the conveyer at a predetermined greater peripheral speed than the speed of extrusion of said rubber stock, a cooling tank adapted to receive and cool the rubber stock, a second conveyer adapted to draw said rubber stock through the tank at a predetermined adjustable rate of travel relative to the first conveyer, a third conveyer operated at materially slower speed than the second conveyer and adapted to shrink the rubber stock, guiding mechanism for positioning the moving strip of rubber stock comprising a pair of laterally spaced rotatably mounted members each of which has a flared skirt portion adapted to underlie the edge portion of the extruded rubber stock and a body portion adapted to engage each edge of the stock, means for superposing a second strip of rubber stock onto the extruded stock, and stitching means for firmly uniting the stocks.

6. The method of treating extruded plastic material that consists in delivering the material in the form of a strip from an extruding machine, applying tension to the strip to stretch the material as it is delivered from the extruding machine, cooling the material in its stretched condition, and subsequently subjecting the strip of material to longitudinal compression to shrink the same and to substantially relieve tensile stresses therein.

7. The method of treating extruded rubber tread stock that consists in extruding the stock of larger cross sectional dimension than the desired final dimension, stretching the stock to lesser cross sectional area than the final area desired, cooling the stock while in stretched condition and subsequently shrinking the stock to increase its cross sectional area to substantially the desired ultimate cross sectional area.

8. The method of treating extruded plastic material which consists in delivering the material in the form of a strip from an extruding machine, stretching the material as it is delivered from the extruding machine, cooling the material in its stretched condition, shrinking the material to substantially relieve tensile stresses therein and regulating the stretching and shrinking of the strip to produce a strip of stock of the desired weight per unit of length.

9. A tread rubber stock fabricating machine comprising an extruding machine, an assembly table, conveying means interposed between the extruding machine and assembly table for continuously delivering a strip of tread rubber stock from the extruding machine to the assembly table, means for operating said conveying means at a speed greater than the rate of extrusion of said stock to stretch the strip as it leaves the extruding machine, means associated with the conveying means for cooling the strip means for shrinking the strip to relieve the tensile stresses therein after cooling, means for delivering cushion stock to the assembly table at substantially the same rate as the tread rubber stock, means for positioning the cushion stock directly over the tread rubber stock and means for stitching the two stocks securely together.

In testimony whereof I affix my signature.

HAROLD A. DENMIRE.